T. C. CRAVEN.
Hay Tedder.
No. 96,892. Patented Nov. 16, 1869.
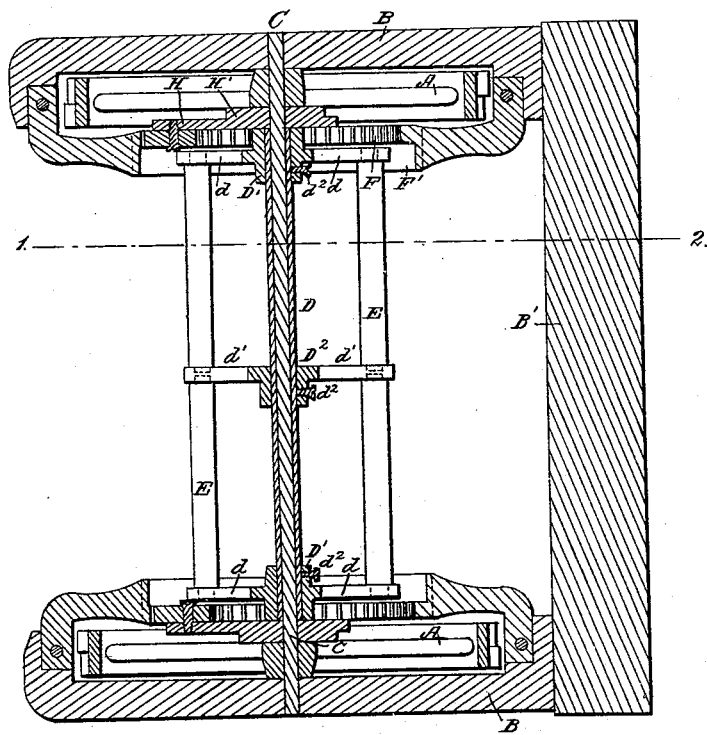
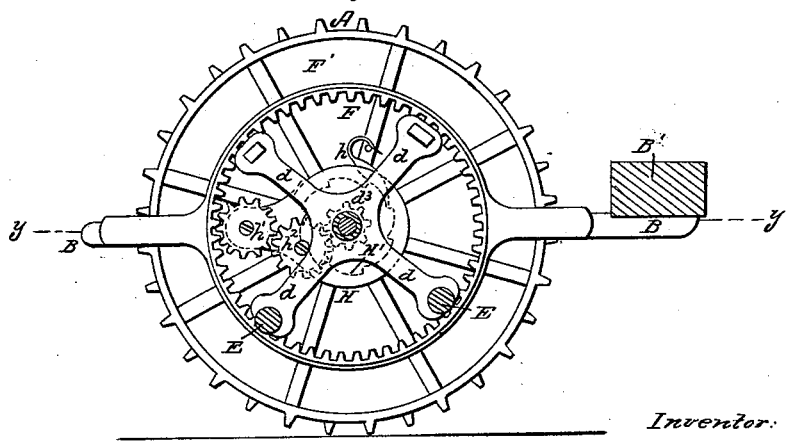
Witnesses:
Alex Mahon
Rufus R. Rhodes.
Inventor:
Thomas C. Craven.
by his Attorney:
A. M. Smith

United States Patent Office.

THOMAS C. CRAVEN, OF ALBANY, NEW YORK, ASSIGNOR TO WILLIAM L. AND HENRY K. BOYER.

Letters Patent No. 96,892, dated November 16, 1869.

IMPROVED HAY-TEDDER.

The Schedule referred to in these Letters Patent and making part of the same

I, THOMAS C. CRAVEN, of the city and county of Albany, and State of New York, have invented certain Improvements in Hay-Tedding Machines, of which the following is a specification.

The first part of my invention relates to the arrangement of the reel and carrying-wheel upon the same axial line, in such manner that the rear girt of the frame shall serve as a support for both, while at the same time the reel is brought forward into such position as will enable it to pick up the hay in advance of the line of tread of said driving-wheels.

The second part of my invention relates to connecting the arms or reel-heads by means of a continuous sleeve, which surrounds and rotates upon the rear girt of the frame; and, in connection with this sleeve, I mount an intermediate reel-head, or set of arms made adjustable, by means of which I am enabled to secure all of the ribs or bars of the reel in their proper position, and also to remove any or all of them at will, by the employment of the single set-screw or key used for fastening the arms upon the sleeve.

Figure 1 is a horizontal sectional view, taken through line $x\ y$, fig. 2; and

Figure 2 is a view of that part of the machine lying outside of line 1–2, fig. 1, said view being taken from the inside.

A A are the main driving-wheels, upon which is supported the frame of the tedder, consisting of the side pieces B B, transverse bar B', and girt, or bar C. The pieces B B and bar B' may be made of any suitable material and form, as convenience shall dictate, but the girt I make preferably of iron, in order to keep its size down as small as is possible, to save friction, while at the same time the requisite amount of strength is attained.

Each end of girt C is rigidly secured to side pieces B, and thus form the rear portion of the frame, and also a support for all of the operating parts of the tedder, as follows:

D is a continuous sleeve surrounding girt C.

Mounted upon this sleeve are three sets of arms, $d\ d^1$, each provided, at its outer end, with a socket, into which sockets are inserted the ribs E, thus forming the reel.

The arms $d$ are adjusted upon sleeve D, by means of set-screws $d^2$, in hubs $D^1\ D^2$, for a purpose which will be hereinafter explained.

The reel is driven by a train of planetary gears, as follows:

F is a rim, provided with cogs upon its inner periphery, and attached to and supported upon the frame by means of arms F. An inwardly-projecting extension of this rim F' constitutes a hoop or band, such as is usually employed in this class of machines to prevent the hay from becoming entangled with the revolving reel.

H is a disk, mounted loosely upon girt C. This disk is connected with and carried by the main driving-wheels A, by means of backing ratchets $h$ engaging with a ratchet-wheel, H', on disk H. Said driving-wheels also rotate freely upon girt C, as an axis.

$h^1$ is a traversing pinion, carried by an arm of disk C.

$h^2$ is an intermediate pinion, also carried by disk H.

$d^3$ is a pinion rigidly attached to hub $D^1$, for the purpose of rotating the reel.

The tedder is provided with a set of the above-described driving-mechanism at each end of the reel, as shown in fig. 1.

The operation of the tedder is as follows:

As it is drawn over the field, the driving-wheels are rotated upon girt C, carrying with them disk H and pinions $h^1\ h^2$. Pinion $h^1$ engages with toothed rim F, which, being stationary, causes said pinion $h^1$ to revolve backward, that is, in a direction contrary to that in which driving-wheel A is revolving. Pinion $h$, engaging with pinion $h^2$, rotates it (pinion $h^2$) forward, and pinion $h^2$, engaging with pinion $d^3$, rotates this one, together with the reel, in a reverse or backward direction.

It will be seen, that by thus mounting the reel upon an axis coincident with the centre of the carry-wheels, I am enabled to pick up the hay in advance of the line of tread of said carrying-wheels, and, further than that, by rotating the reel in a backward direction, I pick it up still further in advance, thus removing all liability to clog or choke the machine by running upon the swath, and thus holding it to the ground.

It will also be apparent, that by loosening the set-screw in the intermediate hub $D^2$, and turning it and arms $d^1$ around upon sleeve C a short distance, the ribs E can be readily removed, without disturbing the arms at the ends of the reel.

Having now described my invention,

What I claim as new, and desire to secure by Letters Patent, is—

1. The stationary girt C, supporting the rotating continuous sleeve or central tubular shaft D of the skeleton reel, in combination with the frame B B B' and wheels A A, substantially as set forth.

2. The combination of the girt C, continuous sleeve or tubular shaft D, arms $d$ and $d^1$, and ribs E, substantially as set forth.

3. The combination, substantially as described, of reel-arm $d\ d^1$, central continuous tubular shaft D, mounted upon a girt which connects the sides of the frame with the stationary gear-rim mounted on the frame, driving-wheels A A, and a system of gears, connecting said driving-wheels with the reel.

THOS. C. CRAVEN.

Witnesses:
WM. R. HEINS,
HENRY CROUCH.